US012712203B2

(12) United States Patent
Xiao et al.

(10) Patent No.: US 12,712,203 B2
(45) Date of Patent: Aug. 18, 2026

(54) SELF-HEALING SOLID-STATE BATTERY CONFIGURATION AND METHOD OF MANUFACTURE THEREOF

(71) Applicants: GM GLOBAL TECHNOLOGY OPERATIONS LLC, Detroit, MI (US); The University of Kentucky, Lexington, KY (US)

(72) Inventors: Xingcheng Xiao, Troy, MI (US); Thomas A Yersak, Royal Oak, MI (US); Yang-Tse Cheng, Lexington, KY (US)

(73) Assignee: GM Global Technology Operations LLC, Detroit, MI (US)

(*) Notice: Subject to any disclaimer, the term of this patent is extended or adjusted under 35 U.S.C. 154(b) by 578 days.

(21) Appl. No.: 18/327,464

(22) Filed: Jun. 1, 2023

(65) Prior Publication Data

US 2024/0405261 A1 Dec. 5, 2024

(51) Int. Cl.

*H01M 10/0562* (2010.01)
*H01M 4/04* (2006.01)
*H01M 50/538* (2021.01)

(52) U.S. Cl.

CPC ..... *H01M 10/0562* (2013.01); *H01M 4/0404* (2013.01); *H01M 4/0419* (2013.01); *H01M 50/538* (2021.01); *H01M 2300/0068* (2013.01); *H01M 2300/008* (2013.01); *H01M 2300/0094* (2013.01)

(58) Field of Classification Search

CPC ........... H01M 10/0562; H01M 50/538; H01M 4/0404; H01M 4/0419; H01M 2300/0068; H01M 2300/008; H01M 2300/0094

USPC ........................................................... 429/94

See application file for complete search history.

(56) References Cited

U.S. PATENT DOCUMENTS

2014/0186679 A1 7/2014 Archer et al.
2017/0098818 A1* 4/2017 Cheng .................. H01M 4/662
2019/0115162 A1* 4/2019 Goodenough ......... H01G 11/10
2019/0273258 A1* 9/2019 Thomas-Alyea .......................... H01M 10/0585
2020/0223704 A1* 7/2020 Neale ................ H01M 10/0525
2020/0266479 A1* 8/2020 Hupfer .............. H01M 10/0562
2021/0202990 A1* 7/2021 Lee ..................... H01M 50/414
2023/0009422 A1* 1/2023 Yao ..................... H01M 4/0404
2023/0321725 A1* 10/2023 Ye ......................... B33Y 70/10

FOREIGN PATENT DOCUMENTS

DE 102017219170 A1 4/2019
DE 102022116107 A1 1/2023

* cited by examiner

*Primary Examiner* — James M Erwin
(74) *Attorney, Agent, or Firm* — Quinn IP Law

(57) ABSTRACT

An electrode stack for a solid-state battery is provided. The electrode stack includes a cathode. The cathode includes a cathode current collector and a first layer of material applied to the cathode current collector. The first layer of material includes a cathode active material, a first ionomer configured as a first binder, and a conductive material. The electrode stack further includes a solid electrolyte separator layer, including a second ionomer configured as a second binder. The electrode stack further includes an anode including a layer including lithium metal, silicon, or graphite and an anode current collector. One of the first ionomer and the second ionomer includes a shape-memory ionomer configured for selectively restoring the electrode stack to an original shape.

16 Claims, 5 Drawing Sheets

SELF-HEALING SOLID-STATE BATTERY CONFIGURATION AND METHOD OF MANUFACTURE THEREOF

GOVERNMENT CONTRACT

This application was made with government support under contract no. DOE DE-EE-0008863, awarded by the Department of Energy. The government has certain rights in the invention.

BACKGROUND

The disclosure generally relates to a self-healing solid-state battery configuration and to a method of manufacture thereof.

Lithium-ion batteries and lithium metal batteries are desirable candidates for powering electronic devices in the consumer, automotive, and aerospace industries due to their relatively high energy density, high power density, lack of memory effect, and long cycle life, as compared to other rechargeable battery technologies, including lead-acid batteries, nickel-cadmium and nickel-metal-hydride batteries.

A solid-state battery cell includes a solid electrolyte. The solid electrolyte may include a first planar primary surface which abuts and contacts a planar primary surface of an anode electrode. The solid electrolyte may include a second planar primary surface which abuts and contacts a planar primary surface of a cathode electrode.

Shape-memory polymers (SMPs) represent responsive polymers that can fix to deformed temporary shapes and recover to their permanent (original) shapes only upon external stimuli.

SUMMARY

An electrode stack for a solid-state battery is provided. The electrode stack includes a cathode. The cathode includes a cathode current collector and a first layer of material applied to the cathode current collector. The first layer of material includes a cathode active material, a first ionomer configured as a first binder, and a conductive material. The electrode stack further includes a solid electrolyte separator layer, including a second ionomer configured as a second binder. The electrode stack further includes an anode including a layer including lithium metal, silicon, or graphite and an anode current collector. One of the first ionomer and the second ionomer includes a shape-memory ionomer configured for selectively restoring the electrode stack to an original shape.

In some embodiments, the solid electrolyte separator layer includes an oxide material configured for being electrochemically stable in relation to the cathode and the anode.

In some embodiments, the solid electrolyte separator layer includes a first sub-layer applied to the first layer of material and including lithium lanthanum zirconium oxide (LLZO), lithium lanthanum titanium oxide (LLTO), lithium germanium vanadium oxide, lithium nitrides, lithium halides, or lithium aluminum titanium phosphate (LATP). The solid electrolyte separator layer further includes a second sub-layer including a sulfide-based solid electrolyte material.

In some embodiments, the first ionomer and the second ionomer both include the shape-memory ionomer.

In some embodiments, the solid electrolyte separator layer includes a double-layer solid electrolyte, wherein the first sub-layer and the second sub-layer exist as discreet layers.

In some embodiments, the solid electrolyte separator layer includes a gradient solid electrolyte layer including a gradually changing mixture between the first sub-layer and the second sub-layer.

A solid-state battery is provided. The solid-state battery includes an electrode stack including a cathode. The cathode includes a cathode current collector and a first layer of material applied to the cathode current collector. The first layer of material includes a cathode active material, a first ionomer configured as a first binder, and a conductive material. The electrode stack further includes a solid electrolyte separator layer including a first sub-layer applied to the first layer of material. The first sub-layer includes lithium lanthanum zirconium oxide (LLZO), lithium lanthanum titanium oxide (LLTO), lithium germanium vanadium oxide, lithium nitrides, lithium halides, or lithium aluminum titanium phosphate (LATP). The first sub-layer further includes a second ionomer configured as a second binder. The solid electrolyte separator layer further includes a second sub-layer including a sulfide-based solid electrolyte material. The electrode stack further includes an anode including a layer of lithium metal and an anode current collector. One of the first ionomer and the second ionomer includes a shape-memory ionomer configured for selectively restoring the electrode stack to an original shape.

In some embodiments, the first ionomer and the second ionomer both include the shape-memory ionomer.

In some embodiments, the solid electrolyte separator layer includes a double-layer solid electrolyte, wherein the first sub-layer and the second sub-layer exist as discreet layers.

In some embodiments, the solid electrolyte separator layer includes a gradient solid electrolyte layer including a gradually changing mixture between the first sub-layer and the second sub-layer.

In some embodiments, the solid-state battery is a prismatic can battery including a plurality of the electrode stacks.

In some embodiments, the electrode stack is a jelly roll electrode.

According to one exemplary embodiment, a method to manufacture an electrode stack of a solid-state battery is provided. The method includes creating a first mixture of particles including a cathode active material, a first ionomer configured as a first binder, and a conductive material. The method further includes electrostatic spray depositing through a first spray the first mixture of particles as a first layer upon a planar substrate configured for operation as a cathode current collector. The first mixture of particles includes a first ionomer configured as a first binder. The method further includes creating a second mixture of particles including lithium lanthanum zirconium oxide (LLZO) lithium lanthanum titanium oxide (LLTO), lithium germanium vanadium oxide, lithium nitrides, lithium halides, or lithium aluminum titanium phosphate (LATP) and a second ionomer configured as a second binder. The method further includes creating a second layer upon the first layer. Creating the second layer includes electrostatic spray depositing through a second spray the second mixture of particles as a first sub-layer of the second layer upon the first layer and electrostatic spray depositing through a third spray a sulfide-based solid electrolyte powder as a second sub-layer of the second layer. The method further includes creating a layer of lithium metal upon the second layer and creating a layer of anode current collector material upon the layer of lithium metal. One of the first ionomer and the second ionomer includes a shape-memory ionomer configured for selectively restoring the electrode stack to an original shape.

In some embodiments, the first ionomer and the second ionomer both include the shape-memory ionomer configured for selectively restoring the electrode stack to an original shape.

In some embodiments, creating the second layer includes electrostatic spray depositing the second mixture of particles as a first discreet sub-layer and subsequently electrostatic spray depositing the sulfide-based solid electrolyte powder as a second discreet sub-layer.

In some embodiments, creating the second layer includes creating a gradient solid electrolyte layer wherein a solid electrolyte mixture changes gradually between the first sub-layer and the second sub-layer.

In some embodiments, the method further includes utilizing a hot roller operation to control porosity of a portion of the electrode stack.

In some embodiments, the sulfide-based solid electrolyte powder includes $Li_2S$—$P_2S_5$ system ($Li_3PS_4$, $Li_7P_3S_{11}$), $Li_2S$—$P_2S_5$—$P_2O_5$ system ($Li_3PS_{3.75}O_{0.25}$, $Li_7P_3S_{9.75}O_{1.25}$), $Li_2S$—$P_2S_5$—LiM; M=Cl, Br, I ($Li_6PS_5Cl$, $Li_6PS_5Br$, $Li_6PS_5I$), or $Li_2S$—$P_2S_5$—$XS_2$; X=Ge, Sn, Si ($Li_{10}GeP_2S_{12}$, $Li_{10}SnP_2S_{12}$, $Li_{10}SiP_2S_{12}$).

In some embodiments, the conductive material includes solid electrolyte particles, carbon black, or graphene.

In some embodiments, the method further includes, subsequent to a period of using the electrode stack and once a cell impedance of the electrode stack is increased by 20% over an original cell impedance, heating the electrode stack above a glass transition temperature of the one of the first ionomer and the second ionomer for 10 minutes for a period of time up to 10 hours.

The above features and advantages and other features and advantages of the present disclosure are readily apparent from the following detailed description of the best modes for carrying out the disclosure when taken in connection with the accompanying drawings.

DETAILED DESCRIPTION

Figure 1A:
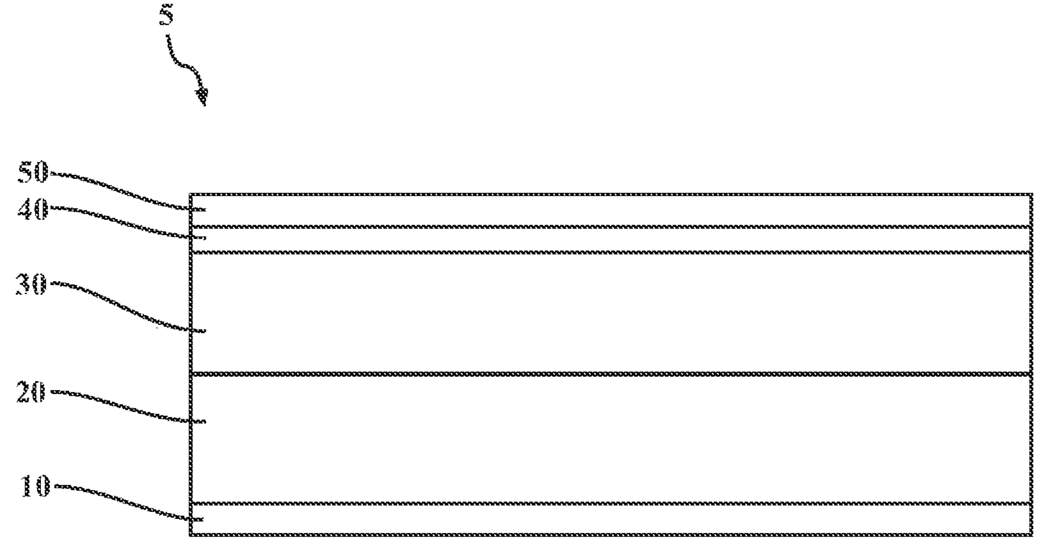
FIG. 1A schematically illustrates in side view a first embodiment of a electrode stack created including one or more layers including a shape-memory material, in accordance with the present disclosure.

A battery system may include one or more solid-state battery cells. A solid-state battery cell may include an anode electrode, a cathode electrode, and a solid electrolyte.

A solid-state battery includes a solid electrolyte, which provides for or facilitates ion transfer between the anode electrode and the cathode electrode. The solid electrolyte further acts as a physical separator between the anode electrode and the cathode electrode, thereby preventing internal short circuits within the battery.

Solid-state batteries may face challenges. Solid-state batteries include stresses at the interface caused by volume changes of anode and cathode during charging and discharging process. As the various layers of the battery cell cycle between charging and discharging cycles, contact area between the layers may be lost due to mismatches between the mechanical properties of neighboring layers. Interfacial delamination may additionally result. Electrode stack pressure sandwiching the layers together may mitigate the interfacial delamination between the solid electrolyte (SE) separator layer and electrodes, but it is more difficult to recover the loss of contact perpendicular the pressure direction in the cathode.

A self-healing solid-state battery configuration and a method of manufacture thereof are provided which mitigate issues associated with interfacial delamination and other mechanical/chemical degradation in a solid-state battery.

The disclosed solid-state battery provides self-healing or self-maintaining operation through a shape-memory effect. The disclosed solid-state battery includes shape-memory polymer (SMP) based nanocomposites which exhibit the self-healing capability and demonstrated that ionomers including Nafion®, which is commercially available through the Chemours Company FC, LLC of Wilmington, Delaware, United States, have shape-memory effect.

In one embodiment, the disclosed battery includes an electrode stack including a cathode layer, an SE separator layer, and an anode layer. In one embodiment, the disclosed electrode stack may be created upon a planar substrate, with electrostatic spray deposited materials for each layer being deposited by a spraying process in sequential layers. One or more rollers or hot roller devices may be utilized to control properties of the electrode stack being created.

The cathode layer and the SE separator layer may include ionomers as a binder to hold active materials and conductive materials together in a cohesive shape. These ionomers may be selected as shape-memory materials, wherein deformation or relative movement of the layers of the electrode stack may be mitigated or reversed by operation of the shape-memory materials resetting dispositions of the layers.

In one embodiment, construction of the disclosed electrode stack may begin with a base planar substrate. In one embodiment, the planar substrate may include a material that is useful as a cathode current collector. The electrode stack may include a first layer applied upon the planar substrate/current collector, which collective form a cathode. In one embodiment, the cathode may include the current collector, a first layer applied to the current collector may include lithium-nickel-manganese-cobalt-oxide (LiNiMn-$CoO_2$ or NMC) and other cathode active materials (CAM)

with an ionomer acting as a binder and nanosized lithium lanthanum zirconium oxide or lithium lanthanum zirconate (LLZO). In one embodiment, the first layer may include LLZO, an ionomer, and carbon black or graphene. This first layer applied to the planar substrate may act as a cathode electrode for a cathode layer of the electrode stack. The cathode may include active material particles premixed with shape-memory ionomer as the binder and solid electrolyte particles/graphene/carbon black as conductive materials.

A second layer may be applied upon the first layer. The second layer may be an SE separator. Sulfides provide excellent ionic conductivity between an SE separator and an anode. However, sulfides in contact with a cathode may cause or result in an undesirable side-reaction taking place between the sulfides and the cathode. The SE separator layer may include at least two sub-layers: a first sub-layer selected to abut or be disposed in contiguous contact with the cathode and a second sub-layer selected to abut or be disposed in contiguous contact with the anode. The SE separator may be a double-layer or gradient layer where a high voltage stable SE material, such as lithium aluminum titanium phosphate (LATP), lithium lanthanum titanium oxide (LLTO), lithium germanium vanadium oxide, lithium nitrides, lithium halides, or LLZO, faces the cathode and a sulfide layer faces the anode.

The second layer including the SE separator may include discreet or distinct sub-layers, or the SE separator may include a gradient SE layer blending gradually between two or more selected materials. A first sub-layer of the second layer may be selected and may include a nanosized LLZO blended with ionomer sub-layer. In a gradient SE layer, this nanosized LLZO blended with ionomer sub-layer may be applied to the cathode initially as 100% or an entirety of the material sprayed upon the cathode to create the first sub-layer. Using a co-electric spray, a mixture of the nanosized LLZO blended with ionomer as a first percentage of the total spray and a second material as a second percentage of the total spray may gradually be changed, with the first percentage dropping and with the second percentage rising. As a result, as the second layer gets further away from the cathode layer, the concentration of nanosized LLZO blended with ionomer in the gradient SE layer will decrease and a concentration of the second material will increase. The second material in the gradient SE layer may include a sulfide electrolyte.

The gradient SE layer may go through a plurality of materials, starting with a first material, gradually transitioning to a second material, gradually transitioning to a third material, and so on. In one embodiment, the gradient SE layer may start close to the cathode with a layer of LATP, a superionic solid electrolyte, mixed with ionomer. The gradient SE layer, moving further away from the cathode layer, may blend in a mixture of LATP and sulfide. The gradient SE layer, moving still further away from the cathode layer, may transition entirely to the sulfide.

The SE layer, instead of being a gradient layer, may include the described materials in discreet or distinct layers in the order of application described. When two discreet layers of materials are present, the SE layer may be described as a double-layer SE. If three discreet layers of material are present, the SE layer may be described as a triple-layer SE.

Either a double-layer SE or a gradient SE layer may employ a sulfide on a side facing the anode. The sulfide may include a sulfide solid electrolyte argyrodite type $Li_6PS_5Cl$ (LPSCl), and/or other argyrodites. The sulfide may alternatively include $Li_2S—P_2S_5—P_2O_5—LiI$) and/or other oxysulfides. The sulfide may alternatively include in $Li_{10}MP_2S_{12}$ (M=Sn, Si, Ge).

In one embodiment, the oxysulfide of the disclosed SE may include a composition described by $xLi_2S\cdot(100-x-y)P_2S_5\cdot yP_2O_5$ where (x=70 to 80 molar percentage; y=0.5-10 molar percentage). Oxysulfide SE compositions may alternatively include $GeS_2$, $B_2S_3$, and $SiS_2$ formers. A modifier may include either $Li_2S$ for Li+ electrolyte.

In another embodiment, the oxysulfide of the disclosed SE may include a composition of $xM\cdot(100-x-y)SF\cdot yOF$ where (x=40 to 80 molar percentage; y=0.5-20 molar percentage). M is a modifier including $Li_2S$, $Li_2O$, or a combination thereof. The SF is a sulfide former including $P_2S_5$, $SiS_2$, $SnS_2$, $GeS_2$, $B_2S_5$, or a combination thereof. The OF is an oxide former including $P_2O_5$, $SiO_2$, $SnO_2$, $GeO_2$, $B_2O_3$, or $AlO_3$. The oxysulfide solid-state electrolyte may further includes an optional dopant present at upon to 30 molar percentage of a total composition.

Sulfide and oxy-sulfide glasses are formed by combining at least two types of materials: one or more glass formers and one or more glass modifiers. The glass former and the glass modifier may be collectively referred to as a glass forming system. The sulfide or oxy-sulfide glass formation may optionally include combining a dopant with the glass former/s and glass modifier/s. For a sulfide glass, both the glass former and the glass modifier include sulfur. An oxy-sulfide glass may include (i): an oxide forming system (e.g., an oxide-containing glass former and an oxide-containing glass modifier) with a sulfide former; (ii) a sulfide forming system (e.g., a sulfide-containing glass former and a sulfide-containing glass modifier) with an oxide former; (iii) a sulfide forming system with an oxide modifier, (iv) an oxide forming system with a sulfide modifier.

The glass former may include a glass-forming sulfide or oxide. Glass forming sulfides include: $P_2S_5$, $SnS_2$, $GeS_2$, $B_2S_3$, $SiS_2$, and combinations thereof, by way of example. Glass-forming oxides include $SiO_2$, $GeO_2$, $P_2O_5$, $B_2O_3$, $Al_2O_3$, and combinations thereof, by way of example. The glass modifier may also include a sulfide or oxide. Sulfide-containing glass modifiers include $Li_2S$. Oxide-containing glass modifiers include $Li_2O$. For use in batteries with lithium-containing negative electrodes, the glass modifier may include lithium (e.g., $Li_2S$, $Li_2O$). To support advantageous electrolytic activity, at least one of the glass former and the glass modifier may contain sulfur. The dopant may be used to improve glass formability, ionic conductivity, and/or stability. For example, LiI may be added as a dopant to increase lithium-ion conductivity by increasing the amount of free lithium ions in the network. In various aspects, the dopant includes: LiI, $Li_3PO_4$, $Li_4SiO_4$, LiCl, and combinations thereof.

The constituent precursors—namely, the glass former/s and the glass modifier/s—react to form a sulfide or oxy-sulfide glass that enables the formation of mobile alkali metal cations. For convenience, the sulfide and oxy-sulfide glass compositions detailed herein will be described in terms of the atomic proportions of their glass forming system constituents. However, when reacted, the constituent precursors will form glasses having anchored tetrahedral anions with mobile lithium (or sodium) ions. For example, a glass that is formed from 70 mole percent $Li_2S$ glass modifier and 30 mole percent $P_2S_5$ glass former may be described as $70Li_2S-30P_2S_5$ and have composition $Li_7P_3S_{11}$ when formed. The glass may include anchored phosphorus sulfide tetrahedral anion structural units ($PS_4^{3-}$) and mobile lithium ions ($Li^+$). As used herein, formulas representing atomic proportion of constituents (e.g., $70Li_2S$-$30P_2S_5$) will be referred to as "empirical formulas," even though they may be further simplified (e.g., $Li_7P_3S_{11}$). Notably, the empirical formulas describe relative proportions of atoms, but do not describe arrangement of atoms or and may not describe quantity of atoms.

The oxysulfide of the disclosed SE may include a composition of $xLi_2S\cdot(100-x-y)P_2S_5\cdot yP_2O_5$. The value x may be in a range from 70 molar percentage to 80 molar percentage, and the value y may be in a range from 0.5 molar percentage to 10 molar percentage.

The oxysulfide of the disclosed SE may include a composition of $xM\cdot(100-x-y)SF\cdot yOF$. The value x may be in a range from 40 molar percentage to 80 molar percentage, and the value y may be in a range from 0.5 molar percentage to 20 molar percentage). The M may be a modifier including $Li_2S$, $Li_2O$, or a combination thereof. The SF may be a sulfide former including $P_2S_5$, $SiS_2$, $SnS_2$, $GeS_2$, $B_2S_5$, or a combination thereof. The OF may be an oxide former including $P_2O_5$, $SiO_2$, $SnO_2$, $GeO_2$, $B_2O_3$, or $AlO_3$.

The oxysulfide of the disclosed SE may further include a dopant present at up to 30 molar percentage of a total composition. The dopant may include LiI, LiCl, LiBr, $Li_3PO_4$, $Li_2SiO_3$, or $Li_4SiO_4$.

Once the SE layer or gradient SE layer is completely formed, a layer of lithium metal, a layer of silicon, or a layer of graphite may be applied or laminated upon the SE layer. The layer of lithium metal, a layer of silicon, or a layer of graphite may function as a lithium metal electrode. Finally, a layer of copper or other material suitable for use as an anode current collector may be deposited upon the lithium metal layer. The layer of lithium metal, a layer of silicon, or a layer of graphite and the layer of copper may function as an anode. The anode may further include silicon (Si), may include a Si composite electrode with ionomer as the binder, and may include carbon black as an additive. The anode may further include graphite. In this way, subsequently deposited layers may create an electrode stack.

The disclosed electrode stack may include a solvent-free fabrication process. A multi-step mixing process may be utilized to premix SE particles/conductive additives/shape-memory ionomer. This mixture may then be electrostatic dry sprayed upon a current collector for cathode fabrication. Subsequently, to spray high voltage stable SE particles with ionomer binder to the cathode until a continuous layer is formed and sulfide-based SE is sprayed on the top to form a double layer SE separator. In an alternative process, a co-spray with different flows may be utilized to create a gradient SE layer, as described herein.

The disclosed ionomer binder provides improved ionic conductivity. The disclosed ionomer binder also provides self-healing capability for resetting shapes and dispositions of the layers in the electrode stack, thereby recovering interfacial contact between the layers. This resetting shapes may be initiated by heating the ionomer binder to a temperature in excess of its glass transition temperature.

The premixing process may maximize the contact between SE powder/binder/conductive additives and cathode active materials.

The electrostatic spray enables the fabrication of a relatively thick electrode with excellent packing density. In addition, as a dry process, the process is solvent free and environment friendly.

The gradient solid electrolyte separator design is useful to avoid an interfacial side-reaction between the sulfide material of the SE and the cathode, while providing good ionic conductivity between the SE separator layer and the anode through the sulfide electrolyte.

FIG. 1A schematically illustrates in side view an exemplary electrode stack 5 created including one or more layers including a shape-memory material and in accordance with the methods described herein. The electrode stack 5 is illustrated including a planar substrate/current collector 10, a first layer 20 applied to the planar substrate/current collector 10, a second layer 30 applied to the first layer 20, a layer of lithium metal 40 applied to the second layer 30, and a layer of copper 50 configured as an anode current collector applied to the layer of lithium metal 40. The layer of lithium metal 40 may also include silicon and/or graphite particles.

The first layer 20 may include a cathode active material, an ionomer that may include a shape-memory ionomer, and a conductive material, such as solid electrolyte particles, carbon black, or graphene. The first layer 20 includes a mixture of nano-sized particles of the different materials. Shape-memory ionomers, as described herein may function as a binder and additionally include an ability to return to an original shape when a resetting event occurs. Such a resetting event may include heating the shape-memory ionomer above a glass transition temperature of the ionomer.

The second layer 30 may include an SE separator layer. The second layer 30 may include a stable oxide SE material useful as a solid electrolyte and compatible to be utilized in direct contact with the first layer 20 and additionally the layer of lithium metal 40.

The layer of lithium metal 40 and the layer of copper 50 are configured for operation as an anode.

Figure 1B:
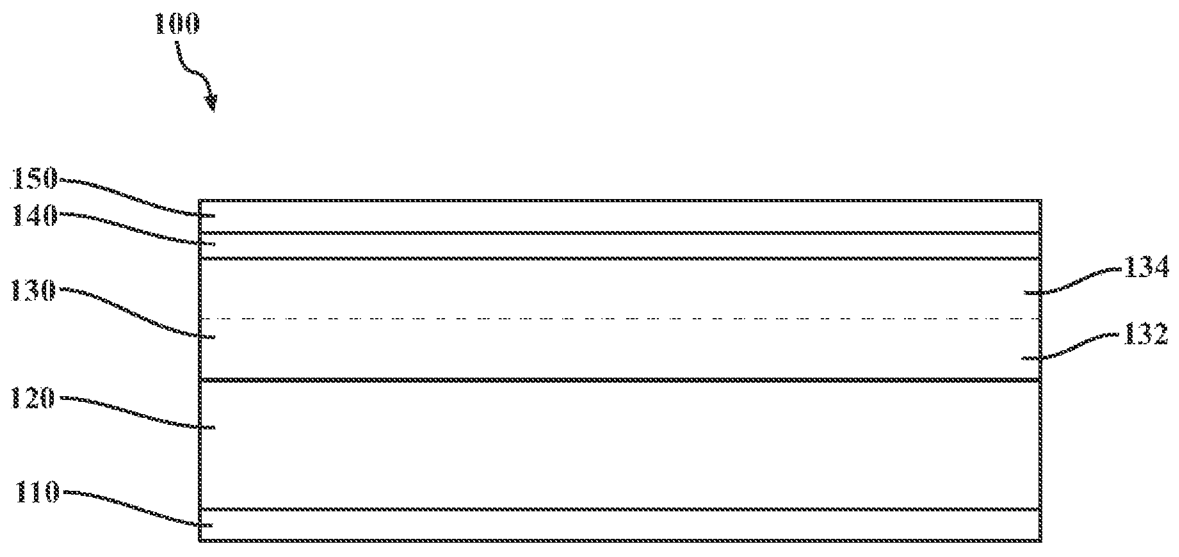
FIG. 1B schematically illustrates in side view a second embodiment of a electrode stack created including one or more layers including a shape-memory material, in accordance with the present disclosure.

FIG. 1B schematically illustrates in side view an exemplary electrode stack 100 created including one or more layers including a shape-memory material and in accordance with the methods described herein. The electrode stack 100 is illustrated including a planar substrate/current collector 110, a first layer 120 applied to the planar substrate/current collector 110, a second layer 130 applied to the first layer 120, a layer of lithium metal 140 applied to the second layer 130, and a layer of copper 150 configured as an anode current collector applied to the layer of lithium metal 140. The layer of lithium metal 140 may also include silicon and/or graphite particles.

The first layer 120 may include a cathode active material, an ionomer that may include a shape-memory ionomer, and a conductive material, such as solid electrolyte particles, carbon black, or graphene. The first layer 120 includes a mixture of nano-sized particles of the different materials. Shape-memory ionomers, as described herein may function as a binder and additionally include an ability to return to an original shape when a resetting event occurs. Such a resetting event may include heating the shape-memory ionomer above a glass transition temperature of the ionomer.

The second layer 130 may include an SE separator layer. The second layer 130 may be a complex layer, including at least two sub-layers. The second layer 130 of FIG. 1B includes a double-layer SE including two discreet or distinct sub-layers 132, 134 of material. The second layer 130 may include the sub-layer 132, a first sub-layer of LLZO and/or LATP mixed with an ionomer that may include a shape-memory ionomer. The second layer 130 may include the sub-layer 134, a second sub-layer including a sulfide SE material. At least one of the first layer 120 and the second layer 130 include a shape-memory ionomer.

The layer of lithium metal 140 and the layer of copper 150 are configured for operation as an anode.

Figure 2:
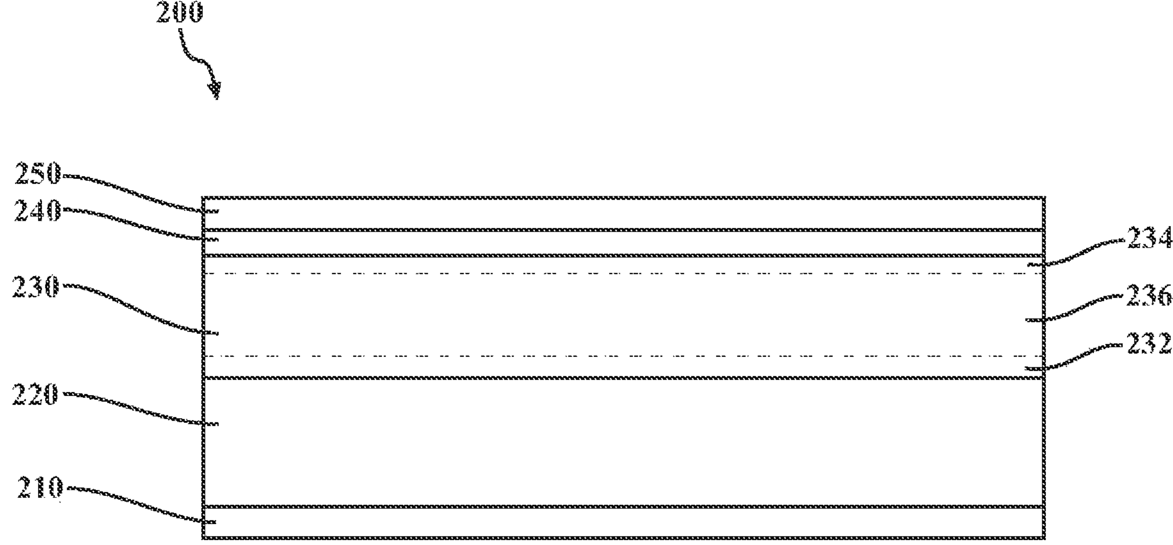
FIG. 2 schematically illustrates in side view a third embodiment of a electrode stack created including one or more layers including a shape-memory material, in accordance with the present disclosure.

FIG. 2 schematically illustrates in side view an exemplary electrode stack 200 created including one or more layers including a shape-memory material and in accordance with the methods described herein. The electrode stack 200 is illustrated including a planar substrate/current collector 210, a first layer 220 applied to the planar substrate/current collector 210, a second layer 230 applied to the first layer 220, a layer of lithium metal 240 applied to the second layer 230, and a layer of copper 250 configured as an anode current collector applied to the layer of lithium metal 240. The layer of lithium metal 240 may also include silicon and/or graphite particles.

The first layer 220 may include a cathode active material, an ionomer that may include a shape-memory ionomer, and a conductive material, such as solid electrolyte particles, carbon black, or graphene. The first layer 220 includes a mixture of nano-sized particles of the different materials.

The second layer 230 may include an SE separator layer. The second layer 230 may be a complex layer, including at least two sub-layers. The second layer is illustrated as a gradient SE layer, including a mixture of materials which starts at 100% or near 100% concentration of a first material in sub-layer 232 on one side of the layer 230, includes 100% or near 100% concentration of a second material in sub-layer 234 on a second side of the layer 230, and transitions gradually therebetween in region 236. The sub-layer 232 may include LLZO and/or LATP mixed with an ionomer that may include a shape-memory ionomer. The second sub-layer 234 may include a sulfide SE material. The region 236 may gradually change from being mostly the LLZO and/or LATP mixed with the ionomer close to the sub-layer 232 to being mostly the sulfide SE material close to the sub-layer 234. At least one of the first layer 220 and the second layer 230 include a shape-memory ionomer.

The layer of lithium metal 240 and the layer of copper 250 are configured for operation as an anode.

Figure 3:
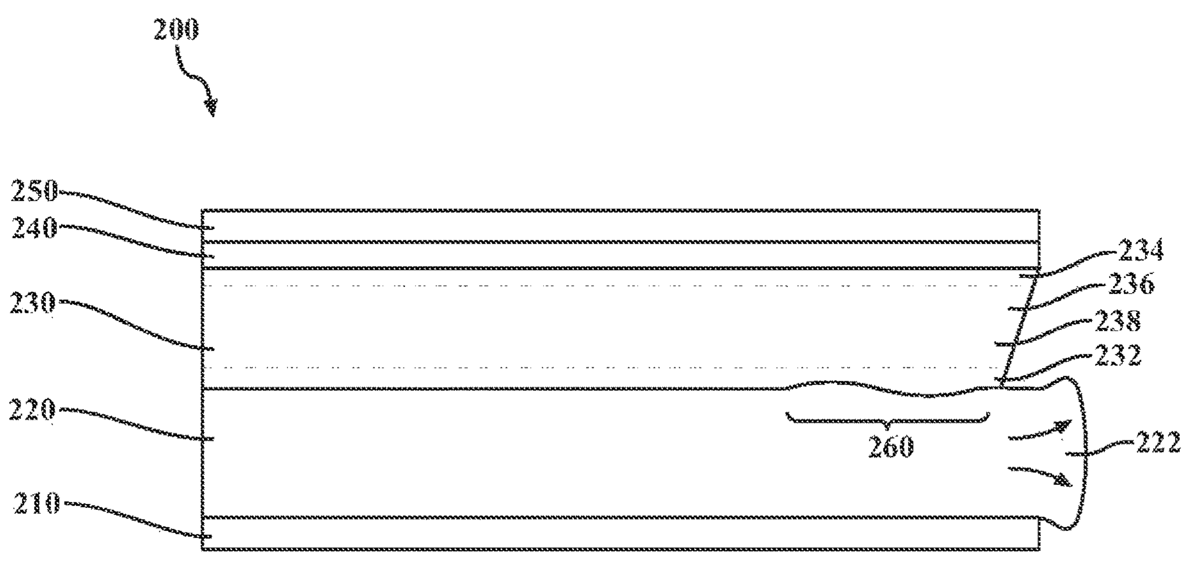
FIG. 3 schematically illustrates in side view the electrode stack of FIG. 2, wherein one or more of the layers have deformed, in accordance with the present disclosure.

FIG. 3 schematically illustrates in side view the electrode stack 200 of FIG. 2, wherein one or more of the layers 220, 230 have deformed. The planar substrate/current collector 210, the first layer 220, the second layer 230, the layer of lithium metal 240, and the layer of copper 250 are illustrated. Sub-layers 232, 234, and region 236 are additionally illustrated. As a result of electrochemical and/or mechanical conditions within the electrode stack 200, portions of the illustrated components have deformed. The first layer 220 has expanded into region 222. The layer 230 has shrunk into region 238. A region of interfacial stress and voids 260 has been created between the layer 220 and the layer 230, such that the layers 220, 230 experience decreased functionality as a result of the region of interfacial stress and voids 260.

Figure 4:
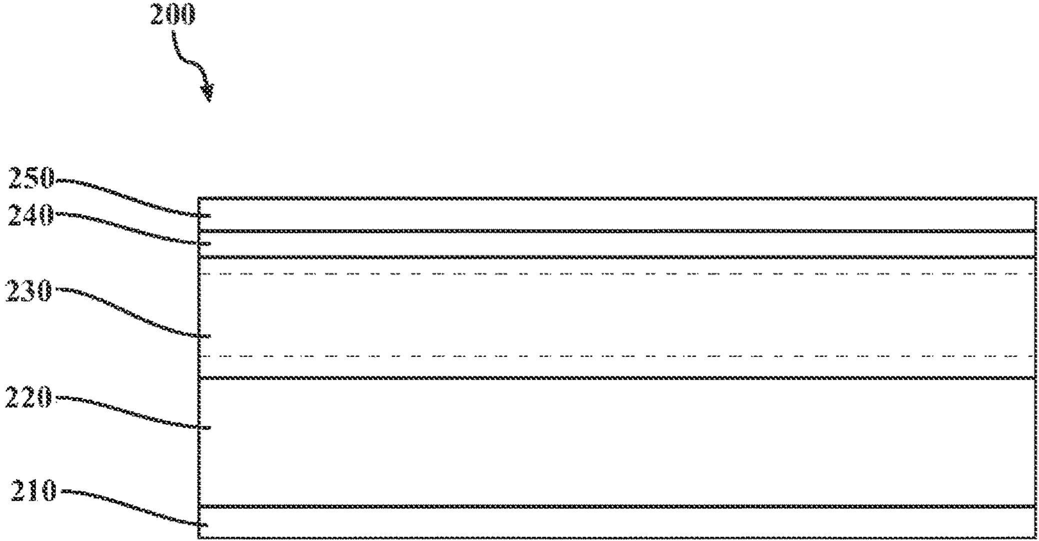
FIG. 4 schematically illustrates in side view the electrode stack of FIG. 3, wherein a resetting event is initiated to reset shapes to the layers and an original or desired shape and disposition of the layers have been restored, in accordance with the present disclosure.

FIG. 4 schematically illustrates in side view the electrode stack 200 of FIG. 3, wherein a resetting event is initiated to reset shapes of the layer 220 and the layer 230 and an original or desired shape and disposition of the layers 220 and 230 have been restored. The planar substrate/current collector 210, the first layer 220, the second layer 230, the layer of lithium metal 240, and the layer of copper 250 are illustrated. Upon heating the shape-memory ionomers past a glass transition temperature, the shape-memory ionomers within the layers 220, 230 activate and return the shape and disposition of the layers 220, 230 to the original shapes illustrated in FIG. 2. FIG. 4 illustrates exemplary resetting of electrode stack 220 components to original shapes by initiating a reset event of the shape-memory ionomers contained therewithin. Similar resetting events may be operated with the electrode stack 5 of FIG. 1A and the electrode stack 100 of FIG. 1B.

Figure 5:
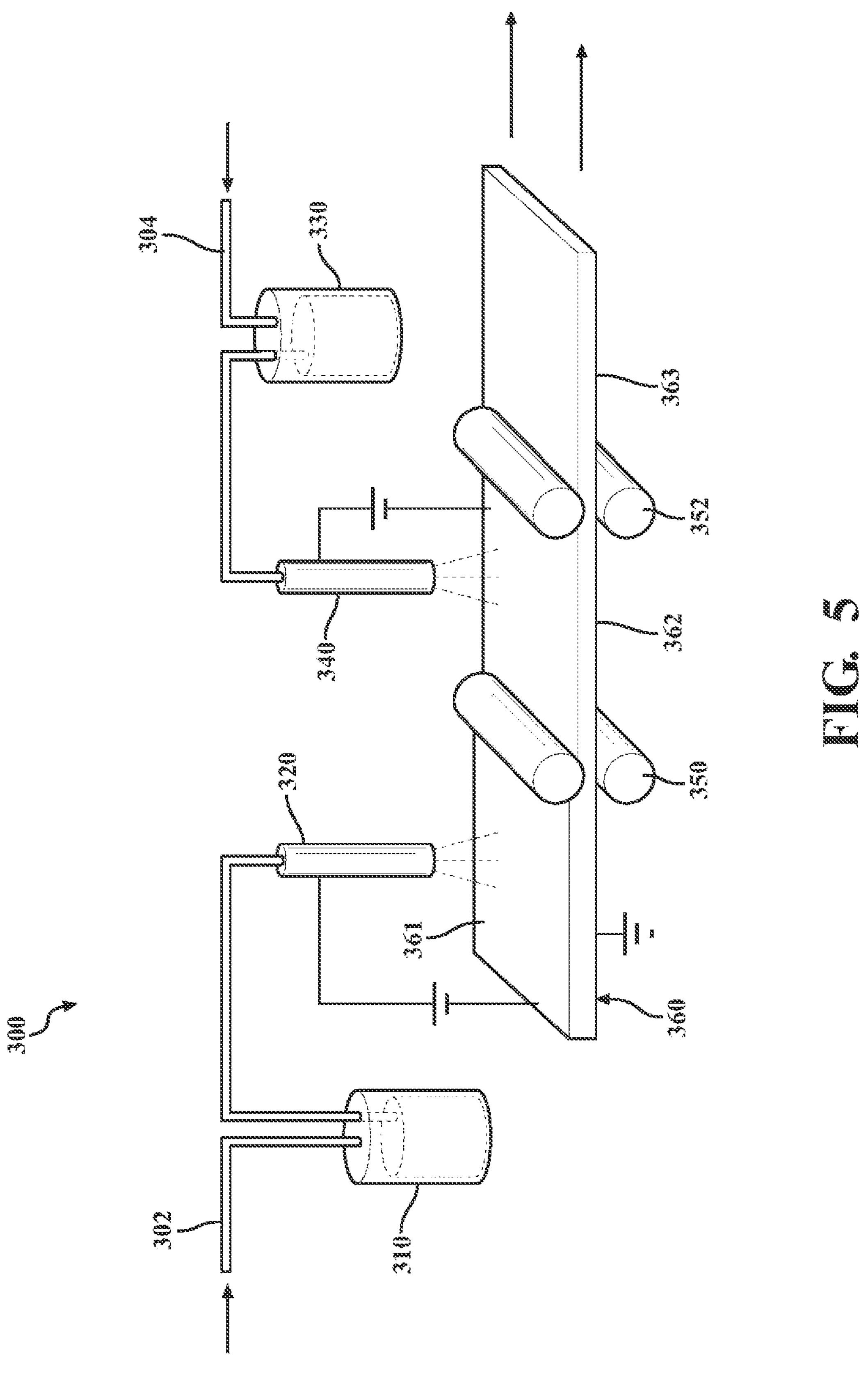
FIG. 5 illustrates a manufacturing operation to create the electrode stack of FIGS. 1 and 2, in accordance with the present disclosure.

FIG. 5 illustrates a manufacturing operation 300 to create the electrode stack of FIGS. 1 and 2. A flow of material 360 is illustrated which moves from left in the illustration to right. The flow of material 360, before any layers are sprayed thereupon, may include a planar substrate/current conductor. A first carry gas line 302 is illustrated, feeding pressurized gas into a first mixing chamber 310. The first mixing chamber 310 creates an exemplary pre-mixture of nano-sized LLZO and shape-memory ionomer. The first carry gas line 302 is utilized to move mixture particles from the first mixing chamber 310 to a first spray operation 320. The first spray operation 320 includes an electrical charge opposite from an electrical charge applied to the flow of material 360, such that a spray of the nano-sized LLZO and shape-memory ionomer particles is electrostatic spray deposited upon the flow of material 360.

A second carry gas line 304 is illustrated, feeding pressurized gas into a second mixing chamber 330. The second mixing chamber 330 creates an exemplary pre-mixture of nano-sized sulfide-based SE powder. The second carry gas line 304 is utilized to move particles from the second mixing chamber 330 to a second spray operation 340. The second spray operation 340 includes an electrical charge opposite from an electrical charge applied to the flow of material 360, such that a spray of the nano-sized sulfide-based SE powder is electrostatic spray deposited upon the flow of material 360.

A first set of hot rollers 350 is configured to press the flow of material 360 after the first spray operation 320, and a second set of hot rollers 352 is configured to press the flow of material 360 after the second spray operation 340. The first set of hot rollers 350 and the second set of hot rollers 352 may apply a calendaring process to the flow of material 360, controlling porosity/density of the flow of material 360 and the resulting electrode stacks produced. Flow 362 illustrates material after the first set of hot rollers 350 are applied, and flow 363 illustrates material after the second set of hot rollers 352 are applied.

The manufacturing operation 300 of FIG. 5 is illustrated in a configuration to create a double-layer SE upon the flow of material 360. The second spray operation 340 may be mobile or repositioned to spray a same portion of the flow of material 360 as the first spray operation 320. Through computerized or electronic control of the first spray operation 320 and the second spray operation 340, a gradient SE layer may be constructed upon the flow of material 360.

The first mixing chamber 310 and the second mixing chamber 330 may include one or more grinding/crushing operations, such as cam mixing drum operation. The first mixing chamber 310 and the second mixing chamber 330 may further include one or more mixing operations, such as a planetary/centrifugal mixing operation.

Figures 6, 7:
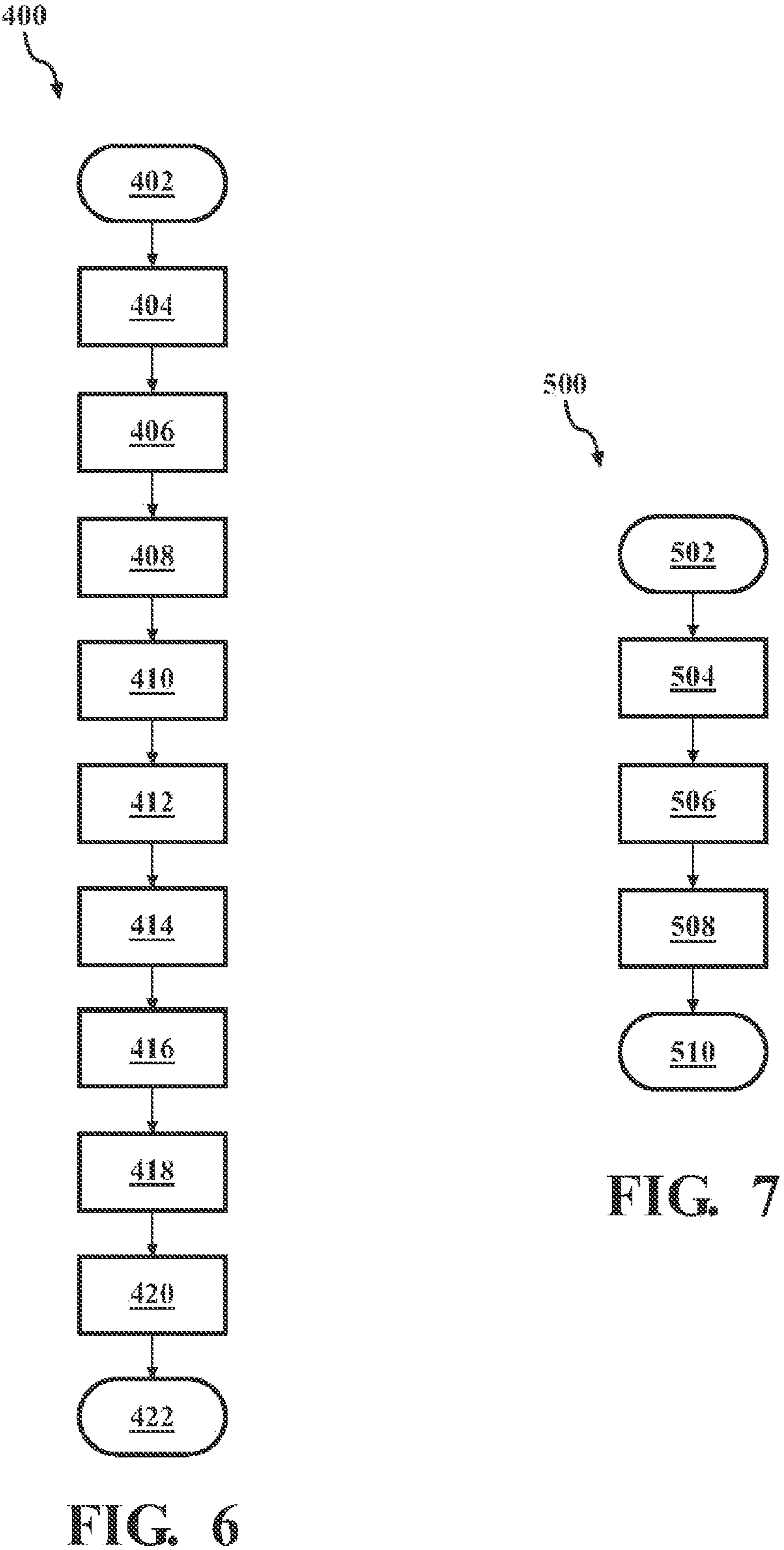
FIG. 6 is a flowchart illustrating a method to manufacture the disclosed battery, in accordance with the present disclosure.
FIG. 7 is a flowchart illustrating a method to utilize the battery configuration including the shape-memory materials described herein to restore a desired shape and disposition of the components of the battery configuration, in accordance with the present disclosure.

FIG. 6 is a flowchart illustrating a method 400 to manufacture the disclosed battery. The method 400 starts at step 402. At step 404, materials including a cathode active material, a shape-memory ionomer, and a conductive material are mixed in preparation for application. At step 406, a first layer including the materials mixed in the step 404 is applied through electrostatic spray deposit spraying to a planar substrate including a material useful as a cathode current collector. At step 408, planar substrate and the first layer are put through a hot roller process. At step 410, a first SE material mixture is created or premixed utilizing LLZO and shape-memory ionomer. At step 412, a second SE material mixture is created or premixed utilizing a sulfide-based SE powder. At step 414, a second layer including an SE separator layer is created upon the first layer utilizing the mixtures created in the step 410 and the step 412. In one embodiment, the two mixtures are applied one at a time to create a double-layer SE. In another embodiment, the mixtures are applied in a co-spraying process as described herein to create a gradient SE layer. The step 414, may additionally include one or more hot roller processes. At step 416, a layer of lithium metal is deposited upon the second layer. At step 418, a layer of copper or other suitable material to create a current collector for an anode is deposited upon the layer of lithium. The multiple layers created in the steps 404 through 418 may be described as an electrode stack. In an optional step 420, the electrode stack may be post-processed, for example, being segmented into sections to enable one to construct a prismatic can battery including multiple iterations of the electrode stack segments. In another embodiment, in the optional step 420, the electrode stack may be wound about a core to create a jelly roll electrode. At step 422, the method 400 ends. The method 400 is exemplary, a number of additional and/or alternative method steps are envisioned, and the disclosure is not intended to be limited to the examples provided herein.

FIG. 7 is a flowchart illustrating a method 500 to utilize the battery configuration including the shape-memory materials described herein to restore a desired shape and disposition of the components of the battery configuration. The battery configuration includes the electrode stack 5 of FIG. 1A, the electrode stack 100 of FIG. 1B, the electrode stack 200 of FIG. 2, or a similar configuration including a shape-memory material within one or more components of the configuration. The method 500 starts at step 502. At step 504, the battery configuration is utilized and deformation and/or displacement occurs which may result in voids or interfacial stresses between components of the battery configuration. At step 506, an initiation event occurs indicating that a restoration operation should be initiated. The initiation event may include a timed event, may be part of a normal charging and discharging cycle or set of cycles, may be initiated in response to a determined drop in battery performance indicating that deformation or other deformities have affected operation of the battery, may be initiated manually by a service technician, or may be initiated by a similar occurrence. At step 508, heat applied to the one or more layers of the battery configuration including shape-memory materials, and, once the ionomers are heated to a temperature above a glass transition temperature for the ionomers, the layer returns to the desired shape and disposition within the battery configuration. At step 510, the method 500 ends. The method 500 is exemplary, a number of additional and/or alternative method steps are envisioned, and the disclosure is not intended to be limited to the examples provided.

The disclosed battery and electrode stack may be utilized in a wide range of applications. For example, the battery may be utilized in a battery electric vehicle, a hybrid vehicle, a boat, an airplane, construction equipment, power-generating equipment, or other similar applications.

While the best modes for carrying out the disclosure have been described in detail, those familiar with the art to which this disclosure relates will recognize various alternative designs and embodiments for practicing the disclosure within the scope of the appended claims.

What is claimed is:

1. An electrode stack for a solid-state battery, the electrode stack comprising:

a cathode including:

a cathode current collector; and a first layer of material applied to the cathode current collector, including:

a cathode active material;

a first shape-memory ionomer configured as a first binder; and a conductive material;

a solid electrolyte separator layer, including a second shape-memory ionomer configured as a second binder; and an anode including:

a layer including lithium metal, silicon, or graphite; and an anode current collector;

wherein the electrode stack has an original cell impedance; and wherein the first shape-memory ionomer and the second shape-memory ionomer are configured for selectively restoring the electrode stack to an original shape after heating the electrode stack above a glass transition temperature of the first shape-memory ionomer and the second shape-memory ionomer for 10 minutes for a period of time up to 10 hours and once a cell impedance of the electrode stack is increased by 20% over the original cell impedance.

2. The electrode stack of claim 1, wherein the solid electrolyte separator layer includes an oxide material configured for being electrochemically stable in relation to the cathode and the anode.

3. The electrode stack of claim 1, wherein the solid electrolyte separator layer includes:

a first sub-layer applied to the first layer of material and including lithium lanthanum zirconium oxide (LLZO), lithium lanthanum titanium oxide (LLTO), lithium germanium vanadium oxide, lithium nitrides, lithium halides, or lithium aluminum titanium phosphate (LATP); and a second sub-layer including a sulfide-based solid electrolyte material.

4. The electrode stack of claim 1, wherein the solid electrolyte separator layer includes a double-layer solid electrolyte including a first sub-layer and a second sub-layer, wherein the first sub-layer and the second sub-layer exist as discrete layers.

5. The electrode stack of claim 1, wherein the solid electrolyte separator layer includes a gradient solid electrolyte layer including a first sub-layer and a second sub-layer and a gradually changing mixture between the first sub-layer and the second sub-layer.

6. A solid-state battery comprising:

an electrode stack including:

a cathode including:

a cathode current collector; and a first layer of material applied to the cathode current collector, including:

a cathode active material;

a first shape-memory ionomer configured as a first binder; and a conductive material;

a solid electrolyte separator layer, including:

a first sub-layer applied to the first layer of material and including:

lithium lanthanum zirconium oxide (LLZO), lithium lanthanum titanium oxide (LLTO), lithium germanium vanadium oxide, lithium nitrides, lithium halides, or lithium aluminum titanium phosphate (LATP); and a second shape-memory ionomer configured as a second binder; and a second sub-layer including a sulfide-based solid electrolyte material; and an anode including:

a layer of lithium metal; and an anode current collector;

wherein the electrode stack has an original cell impedance; and wherein the first shape-memory ionomer and the second shape-memory ionomer are configured for selectively restoring the electrode stack to an original shape after heating the electrode stack above a glass transition temperature of the one of the first shape-memory ionomer and the second shape-memory ionomer for 10 minutes for a period of time up to 10 hours and once a cell impedance of the electrode stack is increased by 20% over the original cell impedance.

7. The solid-state battery of claim 6, wherein the solid electrolyte separator layer includes a double-layer solid electrolyte, wherein the first sub-layer and the second sub-layer exist as discrete layers.

8. The solid-state battery of claim 6, wherein the solid electrolyte separator layer includes a gradient solid electrolyte layer including a gradually changing mixture between the first sub-layer and the second sub-layer.

9. The solid-state battery of claim 6, wherein the solid-state battery is a prismatic can battery including a plurality of electrode stacks.

10. The solid-state battery of claim 6, wherein the electrode stack is a jelly roll electrode.

11. A method to manufacture an electrode stack of a solid-state battery, the method comprising:

creating a first mixture of particles including a cathode active material, a first shape-memory ionomer configured as a first binder, and a conductive material;

electrostatic spray depositing through a first spray the first mixture of particles as a first layer upon a planar substrate configured for operation as a cathode current collector;

creating a second mixture of particles including lithium lanthanum zirconium oxide (LLZO) lithium lanthanum titanium oxide (LLTO), lithium germanium vanadium oxide, lithium nitrides, lithium halides, or lithium aluminum titanium phosphate (LATP) and a second shape-memory ionomer configured as a second binder;

creating a second layer upon the first layer, including:

electrostatic spray depositing through a second spray the second mixture of particles as a first sub-layer of the second layer upon the first layer;

electrostatic spray depositing through a third spray a sulfide-based solid electrolyte powder as a second sub-layer of the second layer;

creating a layer of lithium metal upon the second layer;

creating a layer of anode current collector material upon the layer of lithium metal; and wherein the first shape-memory ionomer and the second shape-memory ionomer are configured for selectively restoring the electrode stack to an original shape; and subsequent to a period of using the electrode stack, waiting for a cell impedance of the electrode stack to increase by 20% over an original cell impedance, then heating the electrode stack above a glass transition temperature of the one of the first shape-memory ionomer and the second shape-memory ionomer for 10 minutes for a period of time up to 10 hours.

12. The method of claim 11, wherein creating the second layer includes:

electrostatic spray depositing the second mixture of particles as the first sub-layer; and subsequently electrostatic spray depositing the sulfide-based solid electrolyte powder as the second sub-layer;

wherein the first sub-layer and the second sub-layer exist as discrete layers.

13. The method of claim 11, wherein creating the second layer includes creating a gradient solid electrolyte layer wherein a solid electrolyte mixture changes gradually between the first sub-layer and the second sub-layer.

14. The method of claim 11, further comprising utilizing a hot roller operation to control porosity of a portion of the electrode stack.

15. The method of claim 11, wherein the sulfide-based solid electrolyte powder includes $Li_2S—P_2S_5$ system ($Li_3PS_4$, $Li_7P_3S_{11}$), $Li_2S—P_2S_5—P_2O_5$ system ($Li_3PS_{3.75}O_{0.25}$, $Li_7P_3S_{9.75}O_{1.25}$), $Li_2S—P_2S_5—LiM$; M=Cl, Br, I ($Li_6PS_5Cl$, $Li_6PS_5Br$, $Li_6PS_5I$), or $Li_2S—P_2S_5—XS_2$; X=Ge, Sn, Si ($Li_{10}GeP_2S_{12}$, $Li_{10}SnP_2S_{12}$, $Li_{10}SiP_2S_{12}$).

16. The method of claim 11, wherein the conductive material includes solid electrolyte particles, carbon black, or graphene.

* * * * *